US009038387B2

(12) United States Patent
Kaufmann et al.

(10) Patent No.: US 9,038,387 B2
(45) Date of Patent: May 26, 2015

(54) SOLAR THERMAL ELECTRICITY GENERATING SYSTEMS WITH THERMAL STORAGE (75) Inventors: Gabriel Kaufmann, Beit Hanany (IL); Leon Afremov, Tel Aviv (IL); Yona Magen, Moshav Nehosha (IL); Binyamin Koretz, Eilat (IL)

(73) Assignee: BRIGHTSOURCE INDUSTRIES (ISRAEL) LTD, Jerusalem (IL)

( * ) Notice: Subject to any disclaimer, the term of this patent is extended or adjusted under 35 U.S.C. 154(b) by 151 days.

(21) Appl. No.: 13/600,176

(22) Filed: Aug. 30, 2012

(65) Prior Publication Data

US 2013/0049368 A1 Feb. 28, 2013

Related U.S. Application Data (60) Provisional application No. 61/529,875, filed on Aug. 31, 2011.

(51) Int. Cl.
*H01L 31/052* (2014.01)
*F01D 15/10* (2006.01)
(Continued)

(52) U.S. Cl.
CPC . *F01D 15/10* (2013.01); *F02C 1/05* (2013.01); *F03G 6/00* (2013.01); *F24J 2/07* (2013.01); *F24J 2/18* (2013.01); *F24J 2/38* (2013.01); *F28D 20/00* (2013.01);
(Continued)

(58) Field of Classification Search
USPC .................................. 290/52; 60/641.8, 653
See application file for complete search history.

(56) References Cited

U.S. PATENT DOCUMENTS

| 4,094,148 A | 6/1978 | Nelson |
| 4,119,143 A | 10/1978 | Robinson, Jr. |

(Continued)

FOREIGN PATENT DOCUMENTS

| DE | 2510168 A1 | 9/1976 |
| DE | 10329623 B3 | 1/2005 |

(Continued)

OTHER PUBLICATIONS

Abengoa Solar, Inc., "Advanced Thermal Storage for Central Receivers with Supercritical Coolants," Grant DE-FG36-08G018149, Jun. 2010.

(Continued)

*Primary Examiner* — Kenneth Bomberg
*Assistant Examiner* — Shafiq Mian
(74) *Attorney, Agent, or Firm* — Miles & Stockbridge P.C.; Mark A. Catan (57) ABSTRACT

Thermal energy can be stored in a fluid-based thermal storage system for later use. The stored thermal energy may be derived from steam generated using insolation in a steam-based solar power system. The thermal storage system can store energy when insolation is generally available. Alternatively or additionally, the thermal energy may be derived from electricity from the electrical grid. For example, the thermal energy can store energy when the electrical grid has excess electricity available for storage. At a later time, the energy stored in the thermal storage system can be released to heat pressurized water or steam in addition to or in place of steam generated by the insolation. For example, the stored thermal energy may be used in preheating the solar power system during startup, in supplementing steam output of the solar power system, or to replace steam generation during low insolation periods.

16 Claims, 6 Drawing Sheets

(51) Int. Cl.
  *F02C 1/05*   (2006.01)
  *F03G 6/00*   (2006.01)
  *F24J 2/07*   (2006.01)
  *F24J 2/38*   (2014.01)
  *F28D 20/00*  (2006.01)
  *F24J 2/18*   (2006.01)
  *F24J 2/10*   (2006.01)

(52) U.S. Cl.
  CPC . *F24J 2002/1076* (2013.01); *F28D 2020/0047* (2013.01); *Y02E 70/30* (2013.01); *Y02E 10/41* (2013.01); *Y02E 10/47* (2013.01); *Y02E 60/142* (2013.01)

(56) References Cited

U.S. PATENT DOCUMENTS

| | | | |
|---|---|---|---|
| 4,171,617 A * | 10/1979 | Sakamoto et al. | 60/641.8 |
| 4,192,144 A | 3/1980 | Pierce | |
| 4,265,223 A | 5/1981 | Miserlis et al. | |
| 4,438,630 A * | 3/1984 | Rowe | 60/676 |
| 5,047,654 A * | 9/1991 | Newman | 290/52 |
| 5,269,145 A | 12/1993 | Krause et al. | |
| 5,417,052 A * | 5/1995 | Bharathan et al. | 60/783 |
| 5,806,317 A * | 9/1998 | Kohler et al. | 60/659 |
| 6,279,312 B1 * | 8/2001 | Hennecke | 60/39.3 |
| 6,701,711 B1 | 3/2004 | Litwin | |
| 6,941,759 B2 * | 9/2005 | Bellac et al. | 60/772 |
| 6,957,536 B2 * | 10/2005 | Litwin et al. | 60/641.8 |
| 6,996,988 B1 | 2/2006 | Bussard | |
| 7,296,410 B2 * | 11/2007 | Litwin | 60/641.12 |
| 7,299,633 B2 | 11/2007 | Murphy et al. | |
| 7,685,820 B2 | 3/2010 | Litwin et al. | |
| 7,882,832 B2 | 2/2011 | Filippone | |
| 7,987,844 B2 * | 8/2011 | Zillmer et al. | 126/611 |
| 2006/0225729 A1 * | 10/2006 | Litwin | 126/573 |
| 2008/0000231 A1 | 1/2008 | Litwin et al. | |
| 2008/0276616 A1 | 11/2008 | Flynn et al. | |
| 2009/0121495 A1 | 5/2009 | Mills | |
| 2009/0125152 A1 | 5/2009 | Skowronski et al. | |
| 2009/0217921 A1 | 9/2009 | Gilon et al. | |
| 2009/0229264 A1 | 9/2009 | Gilon et al. | |
| 2009/0260359 A1 | 10/2009 | Palkes | |
| 2009/0260622 A1 * | 10/2009 | Palkes et al. | 126/610 |
| 2009/0261591 A1 * | 10/2009 | Palkes et al. | 290/52 |
| 2009/0320828 A1 * | 12/2009 | Koketsu et al. | 126/585 |
| 2009/0322089 A1 | 12/2009 | Mills et al. | |
| 2010/0191378 A1 | 7/2010 | Gilon et al. | |
| 2010/0199669 A1 | 8/2010 | Gathmann | |
| 2010/0212318 A1 | 8/2010 | Schaal | |
| 2010/0236239 A1 | 9/2010 | Kroizer et al. | |
| 2010/0295306 A1 * | 11/2010 | Ridnik et al. | 290/52 |
| 2011/0025068 A1 * | 2/2011 | Campbell | 290/52 |
| 2011/0127773 A1 * | 6/2011 | Freund et al. | 290/52 |
| 2011/0198208 A1 | 8/2011 | Olwig et al. | |
| 2011/0232629 A1 * | 9/2011 | Mandel | 126/570 |
| 2011/0314812 A1 * | 12/2011 | Sonwane | 60/641.8 |
| 2012/0103321 A1 | 5/2012 | Coventry | |
| 2012/0216536 A1 * | 8/2012 | Ma et al. | 60/641.8 |
| 2012/0296479 A1 * | 11/2012 | Millar et al. | 700/277 |
| 2013/0081394 A1 * | 4/2013 | Perry | 60/641.8 |
| 2013/0098354 A1 * | 4/2013 | Kummamuru | 126/600 |
| 2013/0292084 A1 | 11/2013 | Luz et al. | |
| 2014/0075939 A1 * | 3/2014 | Aga et al. | 60/641.11 |

FOREIGN PATENT DOCUMENTS

| | | |
|---|---|---|
| EP | 2275649 A1 * | 1/2011 |
| WO | 2008/154599 | 12/2008 |
| WO | 2010/006942 | 1/2010 |
| WO | 2011/140021 | 11/2011 |
| WO | WO2012006288 A2 * | 1/2012 |
| WO | 2012/093354 | 7/2012 |
| WO | 2012/107811 | 8/2012 |
| WO | 2013/018014 | 2/2013 |

OTHER PUBLICATIONS

Kirby, Brendan J., "Frequency Regulation Basics and Trends," Oak Ridge National Laboratory, U.S. Department of Energy, Dec. 2004 [retrieved on Jul. 14, 2014]. Retrieved from the Internet: <URL:http://www.ferc.gov/CalendarFiles/20100526085937-Kirby,%20Frequency%20Regulation%20Basics%20and%20Trends.pdf> ORNL/TM-2004/291.

* cited by examiner

SOLAR THERMAL ELECTRICITY GENERATING SYSTEMS WITH THERMAL STORAGE

CROSS-REFERENCE TO RELATED APPLICATIONS

The present application claims the benefit of U.S. Provisional Application No. 61/529,875, filed Aug. 31, 2011, which is hereby incorporated by reference herein in its entirety.

FIELD

The present application relates generally to the conversion of solar radiation to usable forms of energy, such as heat and/or electricity, and, more particularly, to thermal storage systems for a solar thermal electricity generating system.

SUMMARY

Thermal energy can be stored in a fluid-based thermal storage system for later use. The stored thermal energy may be derived from steam generated using insolation in a steam-based solar power system. The thermal storage system can store energy (i.e., charging the thermal storage system) when insolation is generally available. Alternatively or additionally, the thermal energy may be derived from electricity from the electrical grid. For example, the thermal energy can store energy when the electrical grid has excess electricity available for storage, when electricity rates are relatively low, or at any other time. At a later time, the energy stored in the thermal storage system can be released (i.e., discharging the thermal storage system) to heat pressurized water or steam in addition to or in place of steam generated by the insolation. The stored thermal energy may be used in preheating the solar power system during startup, in supplementing steam output of the solar power system, or to replace steam generation during low insolation periods. For example, at night the radiative heating by insolation to produce superheated steam in the solar power system can be replaced with conductive and/or convective heat transfer of thermal energy (e.g. enthalpy).

In embodiments, a method of producing electricity can include, during a first time period, generating supercritical or superheated steam in a solar thermal system using insolation, driving a steam turbine using the supercritical or superheated steam so as to produce electricity, and storing heat energy in a molten salt. The method can further include, during a second time period, transferring heat energy stored in the molten salt to the solar thermal system for use in producing electricity.

The transferring can serve to preheat feedwater to the solar thermal system. Alternatively or additionally, the transferring can include passing the molten salt through a heat exchanger so as to generate steam in the solar thermal system. Alternatively or additionally, the transferring can increase the enthalpy of pressurized water or steam in the solar thermal system.

The storing heat energy in the molten salt can include heating the salt using dumped or unused insolation by the solar thermal system, using a fossil fuel based heater, and/or using an electric heater powered by grid electricity. The heating using an electric heater can occur at a time when electricity rates are cheapest during a diurnal cycle, at a time when the electrical grid has surplus electricity for storage, or at a time for regulation or load following. The heating can be effective to store the surplus electricity from the electrical grid as heat in the molten salt.

Alternatively or additionally, the storing heat energy in the molten salt can include, at a first portion of the first time period, heating the salt using enthalpy from supercritical or superheated steam, and, at a second portion of the first time period, heating the salt using an electric heater powered by grid or main electricity. The first time period can be in the afternoon. The second time period can be a relatively low insolation period or a startup period for the solar thermal system.

In embodiments, a system can include a solar receiver, a plurality of heliostats, a thermal storage system, a heat exchanger, and an auxiliary heater. The solar receiver can generate steam using insolation directed thereon. The plurality of heliostats can direct insolation onto the solar receiver. The thermal storage system can have first and second reservoirs for holding a thermal storage fluid therein. The first and second reservoirs can be connected together by one or more conduits such that the thermal storage fluid can flow therebetween. The heat exchanger can be in thermal communication with the one or more conduits and can be arranged such that enthalpy is transferred to or from thermal storage fluid flowing in the one or more conduits. The auxiliary heater can heat the thermal storage fluid using one of electricity and a fossil fuel.

The system can also include an electricity generating system that uses the generated steam to produce electricity. The system can also include a controller that controls the thermal storage system, the heat exchanger, and the auxiliary heater. The controller can be configured to during a first time period, charge the thermal storage system using enthalpy transferred from steam from the solar receiver via the heat exchanger, during a second time period, charge the thermal storage system using heat from the auxiliary heater, and, during a third time period, discharge the thermal storage system so as to produce steam from enthalpy stored therein. The thermal storage fluid can include a molten salt and/or a molten metal.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features have not been illustrated to assist in the illustration and description of underlying features. Throughout the figures, like reference numerals denote like elements.

DETAILED DESCRIPTION

Figure 1:
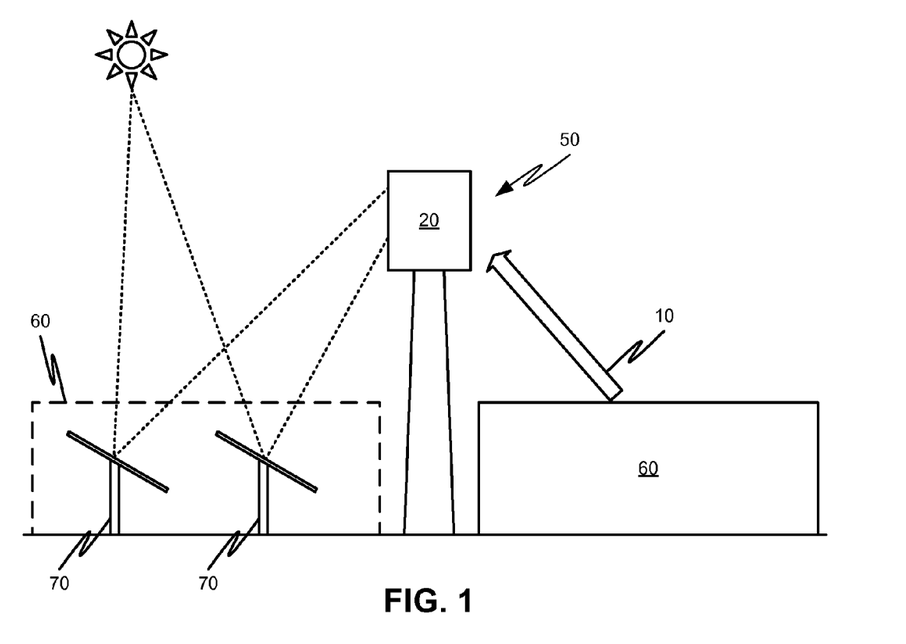
FIG. 1 shows a solar power tower system, according to one or more embodiments of the disclosed subject matter.

Insolation can be used by a solar collection system to generate supercritical or superheated steam and/or for heating molten salt. In FIG. 1, a solar collection system can include a solar tower 50 that receives reflected focused sunlight 10 from a solar field 60 of heliostats (individual heliostats 70 are illustrated in the left-hand portion of FIG. 1 only). For example, the solar tower 50 can have a height of at least 25 meters, 50 meters, 75 meters, or higher. The heliostats 70 can be aimed at solar energy receiver system 20, for example, a solar energy receiving surface of one or more receivers of system 20. Heliostats 70 can adjust their orientation to track the sun as it moves across the sky, thereby continuing to reflect sunlight onto one or more aiming points associated with the receiver system 20. A solar energy receiver system 20, which can include one or more individual receivers, can be mounted in or on solar tower 50. The solar receivers can be constructed to heat water and/or steam and/or supercritical or superheated steam and/or any other type of solar fluid using insolation received from the heliostats. Alternatively or additionally, the target or receiver 20 can include, but is not limited to, a photovoltaic assembly, a steam-generating assembly (or another assembly for heating a solid or fluid), a biological growth assembly for growing biological matter (e.g., for producing a biofuel), or any other target configured to convert focused insolation into useful energy and/or work.

Figure 2:
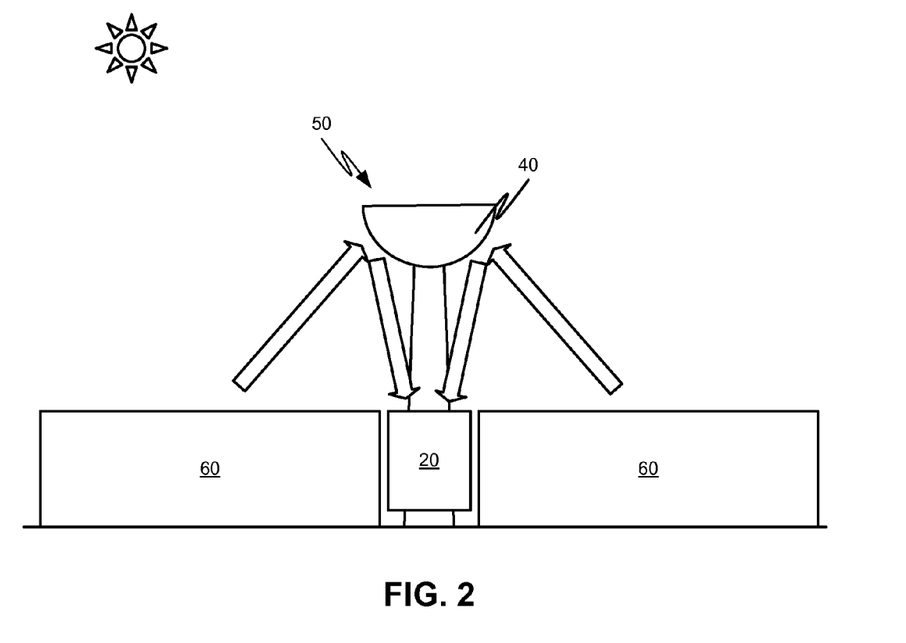
FIG. 2 shows a solar power tower system with secondary reflector, according to one or more embodiments of the disclosed subject matter.

The solar energy receiver system 20 can be arranged at or near the top of tower 50, as shown in FIG. 1. In another embodiment, a secondary reflector 40 can be arranged at or near the top of a tower 50, as shown in FIG. 2. The secondary reflector 40 can thus receive the insolation from the field of heliostats 60 and redirect the insolation (e.g., through reflection) toward a solar energy receiver system 20. The solar energy receiver system 20 can be arranged within the field of heliostats 60, outside of the field of heliostats 60, at or near ground level, at or near the top of another tower 50, above or below reflector 40, or elsewhere.

More than one solar tower 50 can be provided, each with a respective solar energy receiving system thereon, for example, a solar power steam system. The different solar energy receiving systems can have different functionalities. For example, one of the solar energy receiving systems can heat water using the reflected solar radiation to generate steam while another of the solar energy receiving systems can serve to superheat steam using the reflected solar radiation.

The multiple solar towers 50 can share a common heliostat field 60 or have respective separate heliostat fields. Some of the heliostats can be constructed and arranged so as to alternatively direct insolation at solar energy receiving systems in different towers. In addition, the heliostats can be configured to direct insolation away from any of the towers, for example, during a dumping condition.

Figure 3:
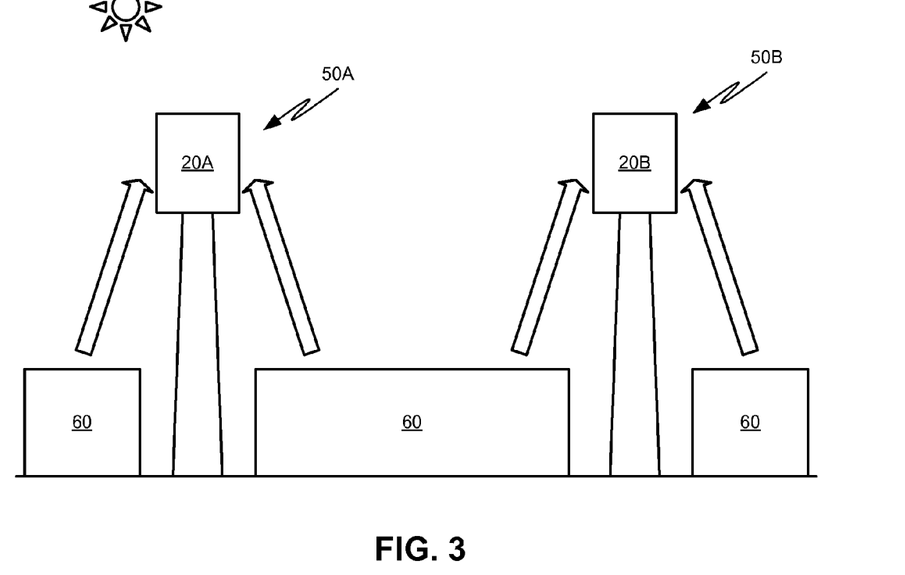
FIG. 3 shows a solar power tower system including multiple towers, according to one or more embodiments of the disclosed subject matter.

As shown in FIG. 3, two solar towers can be provided, each with a respective solar energy receiving system. A first tower 50A has a first solar energy receiving system 20A while a second tower 50B has a second solar energy receiving system 20B. The solar towers 50A, 50B are arranged so as to receive reflected solar radiation from a common field of heliostats 60. At any given time, a heliostat within the field of heliostats 60 can be directed to a solar receiver of any one of the solar towers 50A, 50B. Although only two solar towers with respective solar energy receiving systems are shown in FIG. 3, any number of solar towers and solar energy receiving systems can be employed.

Figure 4:
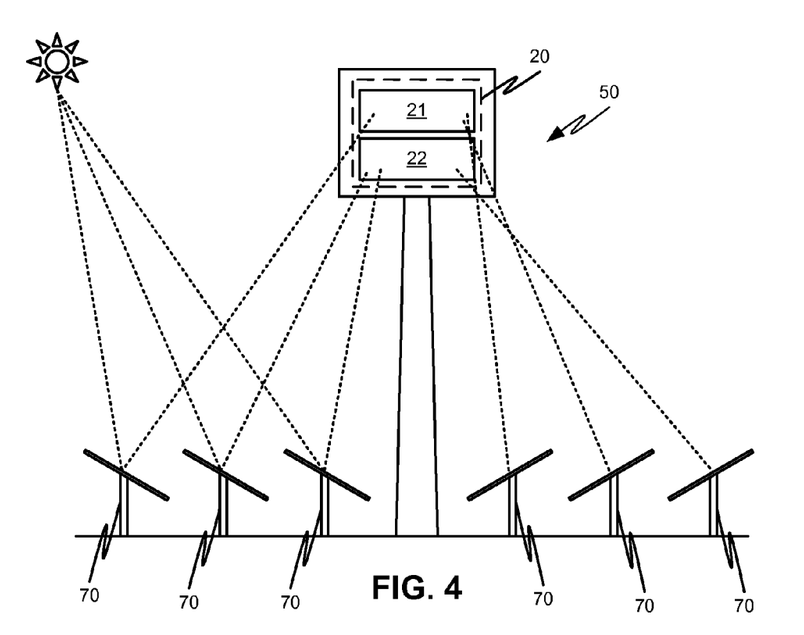
FIG. 4 shows a solar power tower system including multiple receivers in a single tower, according to one or more embodiments of the disclosed subject matter.

More than one solar receiver can be provided on a solar tower. The multiple solar receivers in combination can form a part of the solar energy receiving system 20. The different solar receivers can have different functionalities. For example, one of the solar receivers can heat water using the reflected solar radiation to generate steam while another of the solar receivers can serve to superheat steam using the reflected solar radiation. The multiple solar receivers can be arranged at different heights on the same tower or at different locations (e.g., different faces, such as a north face, a west face, etc.) on the same tower. Some of the heliostats in field 60 can be constructed and arranged so as to alternatively direct insolation at the different solar receivers. As shown in FIG. 4, two solar receivers can be provided on a single tower 50. The solar energy receiving system 20 thus includes a first solar receiver 21 and a second solar receiver 22. At any given time, a heliostat 70 can be aimed at one or both of the solar receivers, or at none of the receivers. In some use scenarios, the aim of a heliostat 70 can be adjusted so as to move the reflected beam projected at the tower 50 from one of the solar receivers (e.g., 21) to the other of the solar receivers (e.g., 22). Although only two solar receivers and a single tower are shown in FIG. 4, any number of solar towers and solar receivers can be employed.

Figure 5:
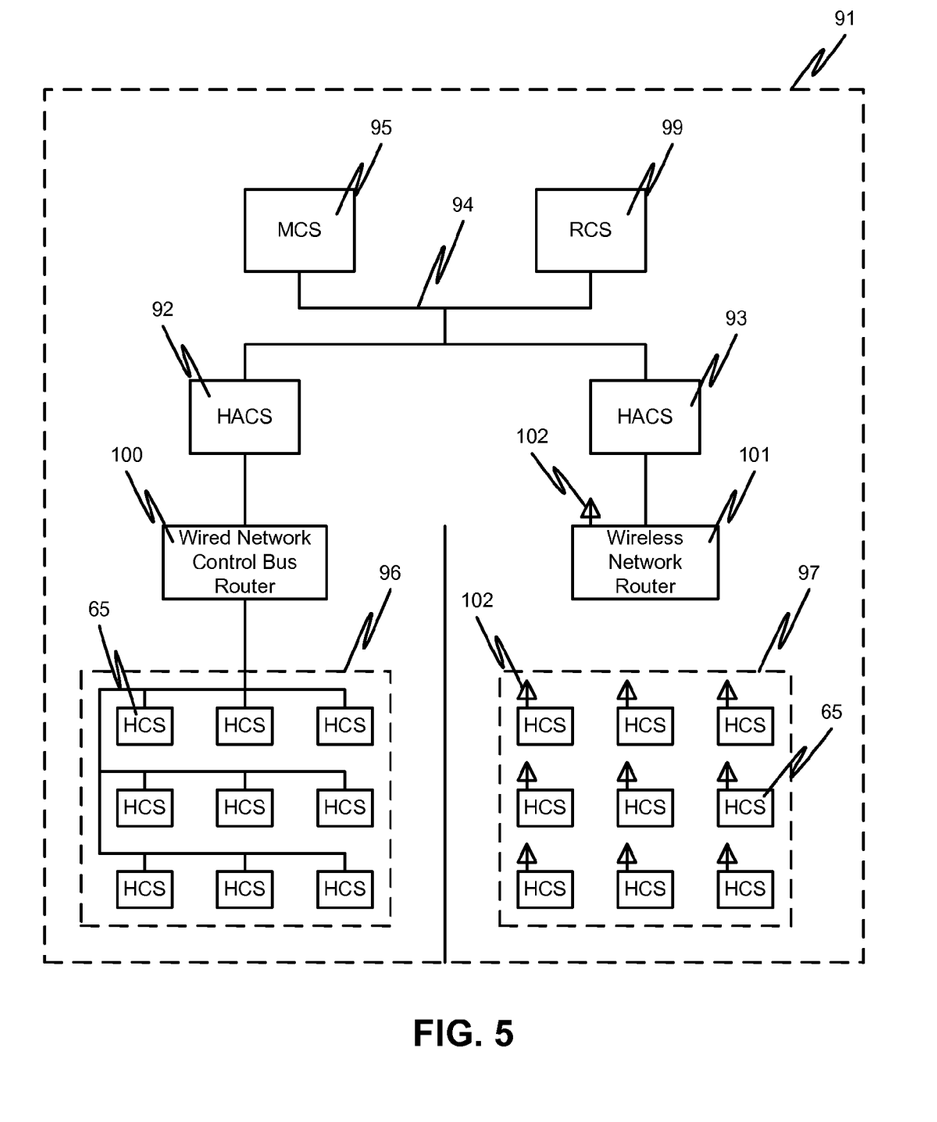
FIG. 5 is a schematic diagram of a heliostat control system, according to one or more embodiments of the disclosed subject matter.

Heliostats 70 in a field 60 can be controlled through a central heliostat field control system 91, for example, as shown in FIG. 5. For example, a central heliostat field control system 91 can communicate hierarchically through a data communications network with controllers of individual heliostats. FIG. 5 illustrates a hierarchical control system 91 that includes three levels of control hierarchy, although in other implementations there can be more or fewer levels of hierarchy, and in still other implementations the entire data communications network can be without hierarchy, for example, in a distributed processing arrangement using a peer-to-peer communications protocol.

At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 70 (not shown) in heliostat fields 96, 97, by communicating with programmable heliostat control systems 65 associated with those heliostats 70 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 5, the portion of network 94 provided in heliostat field 96 can be based on copper wire or fiber optic connections, and each of the programmable heliostat control systems 65 provided in heliostat field 96 can be equipped with a wired communications adapter, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 can communicate with heliostat array control system 93 through network 94 by means of wireless communications. To this end, each of the programmable heliostat control systems 65 in heliostat field 97 is equipped with a wireless communications adapter 102, as is wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

A thermal storage system can be a part of a start-up procedure for and/or to supplement insolation-based electricity production of a solar collection system. The solar collection system can use concentrated/reflected insolation, for example, from a field of heliostats to generate superheated or supercritical steam, which can drive a steam turbine for electricity production. The thermal storage system can store enthalpy in a molten salt or molten metal, which can transfer heat to a working fluid (e.g., water and/or steam) of the solar collection system. During times of reduced insolation (e.g., start-up and/or during morning hours) enthalpy stored in the thermal storage fluid can be transferred to the working fluid by flowing the thermal storage fluid through a heat exchanger. At times of increased insolation (e.g., when insolation conditions exceed system demands and/or during afternoon hours) and/or when economically desirable (e.g., when electricity rates are low, such as during late night or early morning hours), the thermal storage fluid can be heated by the insolation-heated working fluid or by other heating means (e.g., electrical, fossil fuel based, or reflected/concentrated insolation) so as to store enthalpy in the thermal storage system for later use in generating electricity or for other uses. For example, enthalpy from the thermal storage fluid can be used as an energy source for preheating the solar collection system during startup. U.S. Publication No. 2010/0236239, entitled "Solar Receiver," which is incorporated by reference herein in its entirety, describes various solar energy system configurations including an auxiliary preheater for use in startup. The auxiliary preheater can be gas-based or electric-based and can be used for preheating feedwater. International Publication No. WO 2011/140021, entitled "Systems, Methods, and Devices for Operating a Solar Thermal Electricity Generating System," which is also incorporated by reference herein in its entirety, describes the use of auxiliary thermal energy, such as gas-firing, to heat steam that is conveyed to a superheating or reheating solar receiver to facilitate startup. According to one or more embodiments of the disclosed subject matter, indirect start-up assistance can be provided using energy stored as enthalpy in the thermal storage fluid of the thermal storage system. The thermal storage system could provide enthalpy to the auxiliary preheater (as disclosed in the '239 and/or '021 publications incorporated by reference above) to preheat feedwater or steam provided to the solar receiver.

The thermal storage system may include one or more reservoirs, for example, as disclosed in International Application No. PCT/IB12/53874, entitled "Solar Energy Thermal Storage Systems, Devices, and Methods," which is also incorporated by reference herein in its entirety. The '874 application describes, among other things, the use of thermal storage as a buffering device for operating a solar power plant. According to embodiments of the disclosed subject matter, a thermal storage system with molten salt or molten metal, for example, as described in the '874 application incorporated above, is used to facilitate start-up of a system, for example, as described in '239 or the '021 publications. For example, the hot or molten salt in a thermal storage system is used as an auxiliary energy source to facilitate start-up of the solar thermal energy system, for example, by generating steam in a heat exchanger from enthalpy stored in the hot or molten salts.

In one or more embodiments of the disclosed subject matter, electricity from an electrical grid can be used to heat the salts. The electrical heating can occur at a time when electricity rates are comparatively low, as described in the '239 publication (for example, during early morning hours). Alternatively or additionally, the electrical heating can occur at other times for regulation, load following or other ancillary services. Such electrical heating may be independent of (i.e., alone) or in addition to (i.e., concurrent with) heating of the salts using extra or excess insolation from the solar thermal energy system.

In one or more embodiments, the electric heating of the molten salt can be used to store electricity from the grid as an alternative or supplement to other grid-based electrical storage devices. For example, when the energy utility or electrical grid operator has excess electricity generation during a certain time period, the excess electricity can be used to heat the molten salt (e.g., via an electric heater) so as to store thermal energy therein. The molten salt can thus be used like pumped hydro or compressed air storage systems, which convert electricity to potential energy, or like a battery, which stores electricity electrochemically. The stored thermal energy can be employed at a later time in the generation of steam for use by the system in the production of electricity.

In one or more embodiments, a thermal storage fluid from a cold tank of the thermal storage system can be directed to a heat exchanger at times, where the thermal storage fluid can be heated with enthalpy from supercritical or superheated steam. At other times, the thermal storage fluid can be directed to an auxiliary heater wherein the thermal storage fluid is heated using main or grid electricity, by burning a fossil fuel (e.g., natural gas), or by combinations thereof.

In a non-limiting example, during daylight hours (i) steam is generated by subjecting pressurized liquid water to insolation; (ii) a first portion of the steam is used to drive a turbine; and (iii) a second portion of the steam is used to heat a thermal storage fluid of the via conduction and/or convection. This second portion of steam is used to "charge" the thermal storage system. Alternatively or additionally, an auxiliary heater employing electricity from the electrical grid and/or heat from fossil fuels can be used to charge the thermal storage system. When solar energy is not available, when solar energy is available at less than a rated capacity of the solar power plant, or when it is desirable to produce a greater amount of electricity (e.g., during periods of higher tariffs) enthalpy of the solar energy storage system can be used to preheat the solar collection system, to supplement steam production by the solar collection system, or to replace steam production by the solar collection system.

According to one or more embodiments of the disclosed subject matter, the enthalpy can be derived from heated molten salt or molten metal. The discharge of the thermal storage system occurs with the transfer of enthalpy from the thermal storage system to the pressurized water. This steam generated from enthalpy of the energy storage system may be used to drive the same turbine that was driven during the daylight hours. Alternatively, any other turbine may be used to generate the electricity. In some embodiments, the turbine, driven by enthalpy of the thermal storage system, operates at a lower pressure than when operating by steam generated by insolation.

In one or more embodiments, the thermal storage system includes at least two separate thermal storage reservoirs, which can be substantially insulated to minimize heat loss therefrom. A thermal storage medium can be distributed among or in one of the two storage reservoirs. For example, the thermal storage medium can be a molten salt and/or molten metal and/or other high temperature (i.e., >250° C.) substantially liquid medium. The thermal storage medium can be heated by convective or conductive heat transfer in a heat exchanger. This net transfer of enthalpy to the thermal storage medium in the thermal storage system is referred to herein as charging the thermal storage system. When insolation decreases, enthalpy can be transferred from the thermal storage medium to the solar fluid via the same or a different heat exchanger. This net transfer of enthalpy from the thermal storage medium of the thermal storage system is referred to herein as discharging the thermal storage system.

As used herein, the term "charging" a thermal storage system relates to an operation in which heat is transferred from an external source, such as steam or an auxiliary heater, to the thermal storage liquid in order to increase the overall thermal potential of the thermal storage system. In one or more embodiments, "charging" of the thermal storage system can be carried out in parallel with the transferring of thermal storage liquid from a relatively cold storage reservoir to a relatively hot storage reservoir. In some embodiments, the temperature of the cold tank has a temperature of about the melting point of the molten metal and/or molten salt. In some embodiments, the melting point of the molten metal and/or molten salt is 220° C. In some embodiments, the temperature of the cold tank is at least 50° above the melting point of the thermal storage fluid. In one or more non-limiting embodiments of the disclosed subject matter, the thermal storage system is charged when enthalpy is transferred from supercritical or superheated steam in order to harvest the enthalpy of the steam and thereby cooling the steam to become subcooled liquid, a mixture of steam and water, or saturated steam.

As used herein, the term "discharging" of a thermal storage system refers to the opposite of "charging." In this operation, heat is transferred from the thermal storage liquid to an external medium in order to decrease the overall thermal potential of the thermal storage system. In some embodiments, the external medium may include pressurized water, pressurized subcritical steam or supercritical or superheated steam.

Figure 6A:
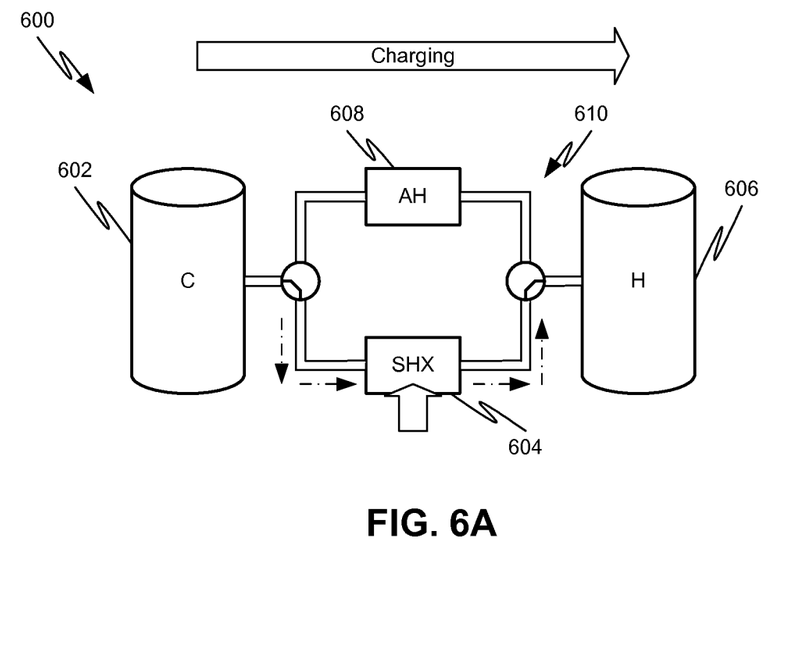
FIG. 6A is a simplified diagram showing an arrangement for a thermal storage system during charging with steam, according to one or more embodiments of the disclosed subject matter.
Figure 6B:
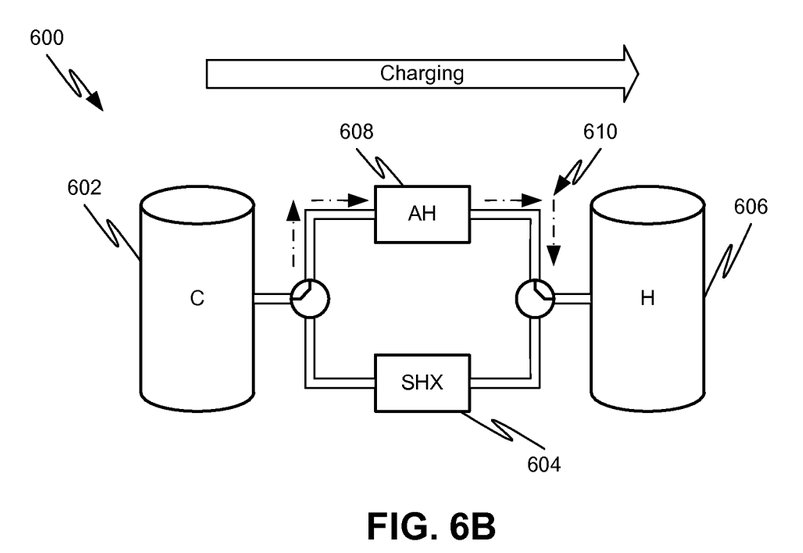
FIG. 6B is a simplified diagram showing an arrangement for a thermal storage system during charging by an electric heater, according to one or more embodiments of the disclosed subject matter.
Figure 6C:
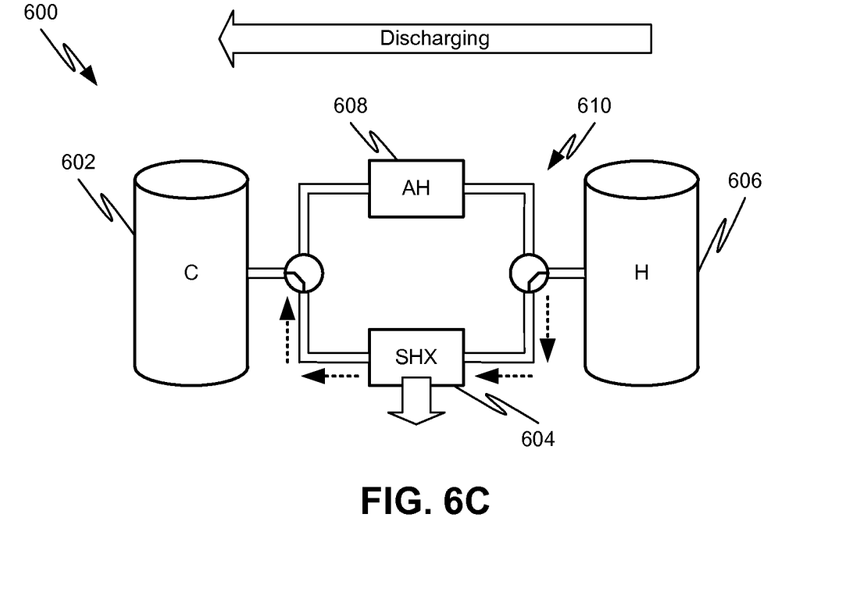
FIG. 6C is a simplified diagram showing an arrangement for a thermal storage system during discharging, according to one or more embodiments of the disclosed subject matter.

Each thermal storage reservoir can be, for example, a fluid tank or a below-grade pool. Referring to FIGS. 6A-6C, a thermal storage system 600 with fluid tanks as the thermal storage reservoir is shown. A first fluid tank 602 can be considered a relatively cold reservoir, in that the temperature during the charging and/or discharging modes is maintained at substantially a temperature of $T_C$, which is the lowest temperature in the thermal storage system. A second fluid tank 606 can be considered a relatively hot reservoir, in that the temperature during the charging and/or discharging modes is maintained at substantially a temperature of $T_H$, which is the highest temperature in the thermal storage system.

During the charging phase (flow directions illustrated by dash-dot lines in FIGS. 6A-6B), thermal storage medium can be transferred from the cold reservoir 602 of the thermal storage system 600 to the hot reservoir 606 of the thermal storage system, as designated by the block arrow in FIGS. 6A-6B. Reconfigurable fluid pathway 610 can fluidically connect the cold reservoir 602 and the hot reservoir 606 together. The pathway 610 can include one or more fluid conduits and one or more flow control devices to switch between one or more flow paths between the two reservoirs.

For example, FIG. 6A shows a configuration of the thermal storage system 600 during charging using steam produced using insolation. One or more heat exchangers 604 can be provided in the flow path between the two reservoirs and is in thermal communication with the solar receiver. Enthalpy from steam generated by the solar receiver is transferred to the thermal storage fluid flowing through the heat exchanger. In another configuration, as shown in FIG. 6B, the thermal storage system 600 is charged using an auxiliary heater 608. Thermal storage fluid flowing through the auxiliary heater can be heated, for example, using electricity or fossil fuels. Alternatively, the thermal storage fluid may be heated in the auxiliary heater in a non-flow-through manner. Thus, the thermal storage fluid may be directed to the auxiliary heater where it remains until heated to a sufficient transfer, after which it is directed to the hot reservoir 606.

Although shown as separate configurations, it is contemplated that charging of the thermal storage system 600 can be accomplished using both steam from insolation (i.e., via enthalpy transfer in heat exchanger 604) and the auxiliary heater in parallel. In such an embodiment, a portion of the thermal storage fluid can be directed to the heat exchanger 604 while another portion of the thermal storage fluid can be directed to the auxiliary heater 608. Alternatively, the charging of the thermal storage system 600 can be accomplished using the steam from insolation and the auxiliary heater in series. In such an embodiment, the thermal storage fluid can be directed to the heat exchanger 604 and then to the auxiliary heater 608 for further heating (or vice versa).

During the discharging phase (flow directions illustrated by dotted lines in the FIG. 6C), the flow of thermal storage medium can be reversed so as to flow from the hot reservoir 606 to the cold reservoir 602 of the thermal storage system 600, as designated by the block arrow in FIG. 6C. The thermal storage fluid can flow through heat exchanger 604 (or any other heat exchanger) to transfer enthalpy therein back to the solar collection system, for example, to heat feedwater or steam for the solar receiver.

The particular arrangement and configuration of configurable flowpath 610 in FIGS. 6A-6C is for illustration purposes only. Variations of the arrangement, number, and configuration of the fluid conduit are also possible according to one or more contemplated embodiments. In addition, multiple fluid conduits can be provided in parallel, such that fluid flowing between the reservoirs can be distributed across the multiple conduits. Alternatively or additionally, multiple fluid conduits can be provided in parallel, but with fluid flow in one conduit being opposite to that in the other conduit. For example, a return conduit can be provided between the first reservoir and the second reservoir in addition to a forward conduit such that at least some fluid can be returned to the first reservoir. The direction of the net flow between the reservoirs (i.e., the flow in the forward conduit(s) minus the flow in the reverse conduit(s)) can depend on the particular mode of operation. For example, the net flow in the charging phase can be from the colder reservoir to the hotter reservoir and reversed in the discharging phase.

One or more pumps (not shown) can be included for moving the thermal storage medium between reservoirs. Additional flow control components can also be provided, including, but not limited to, valves, switches, and flow rate sensors. Moreover, a controller (for example, see FIGS. 7A-7B) can be provided. The controller can control the thermal storage fluid medium within the thermal storage system. The controller can include any combination of mechanical or electrical components, including analog and/or digital components and/or computer software. In particular, the controller can control the storage medium flow in tandem with the solar fluid to maintain a desired temperature profile within the thermal storage system for optimal (or at least improved) heat transfer efficiency. For example, the first and second reservoirs can be maintained at a temperature, $T_C$, above the melting point of the thermal storage medium such that the thermal storage medium remains in a substantially fluid phase so as to allow pumping of the thermal storage medium.

Figure 7A:
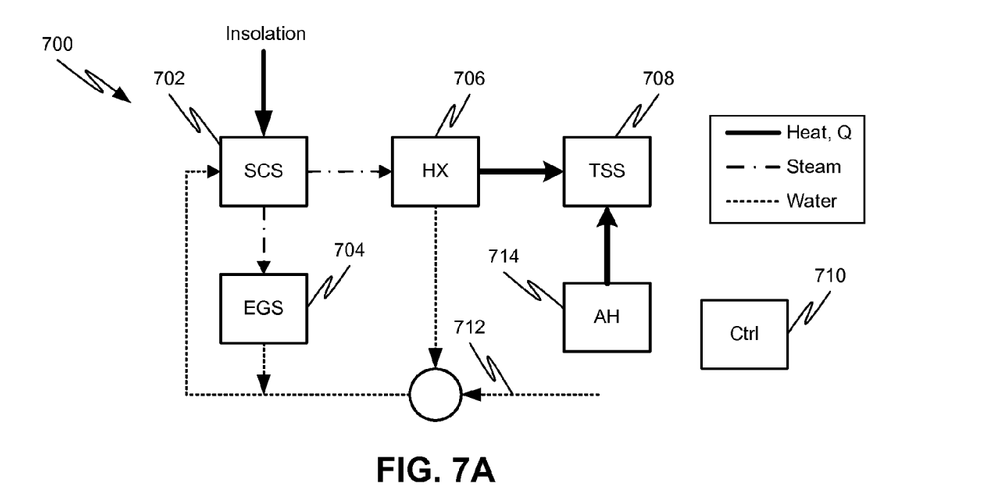
FIG. 7A is a simplified diagram showing the interaction between a solar collection system, a thermal storage system, and an electricity generation system during a charging mode, according to one or more embodiments of the disclosed subject matter.
Figure 7B:
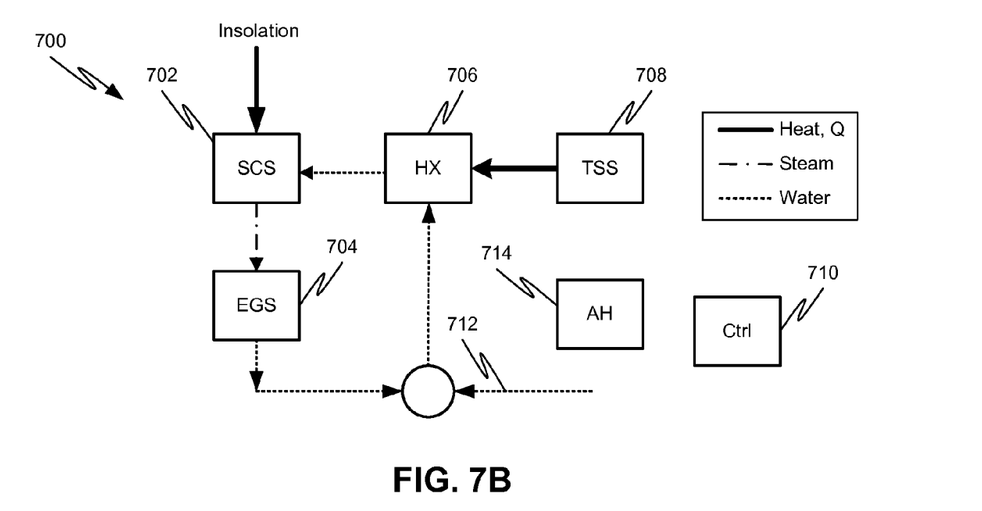
FIG. 7B is a simplified diagram showing the interaction between a solar collection system, a thermal storage system, and an electricity generation system during a discharging mode, according to one or more embodiments of the disclosed subject matter.

Referring to FIGS. 7A-7B, simplified diagrams of the interaction of a solar collection system, a thermal storage system, and an electricity generation system during various charging and discharging phases are shown. In particular, FIG. 7A shows the system setup 700 and the general flow of heat and fluids during a charging phase. FIG. 7B shows the system setup and the general flow of heat and fluids during discharging phase where insolation may or may not be available. In FIGS. 7A-7B, a thick arrow represents energy transfer, either in the form of insolation or enthalpy; a dotted arrow represents the flow of water; and a dash-dot arrow represents the flow of steam. Although FIGS. 7A-7B are discussed with respect to water/steam as the solar fluid, it should be understood that other solar fluids can also be used according to one or more contemplated embodiments.

Referring to FIG. 7A, a charging phase of the thermal storage system 708 is shown. A solar collection system 702 can receive insolation and use the insolation to produce steam from pressurized feedwater 712. Optionally, the resulting steam can be output from the solar collection system 702 and split into at least two portions: a first portion designated for thermal storage and a second portion designated for electricity generation. The relative proportions of the first and second portions can be based on a variety of factors, including, but not limited to, the amount of enthalpy in the generated steam, current electricity demand, current electricity pricing, and predicted insolation conditions. A control system 710 can be provided for regulating the operation of the solar collection system 702, the thermal storage system 708, the electricity generation system 704, the one or more heat exchangers 706, the auxiliary heater 714, and/or other system or flow control components (not shown).

The first portion of the steam can be directed to an electricity generation system 704, which uses the first portion of the steam to produce electricity and/or other useful work. For example, the electricity generation system 704 can include a plurality of turbines. Eventually, the steam can be condensed to produce water, which can be directed back to the solar collection system 702 for subsequent use in producing steam. Meanwhile, the second portion of the steam can be directed to heat exchanger 706. The heat exchanger 706 is in thermal communication with a thermal storage system 708. Steam entering the heat exchanger 706 releases enthalpy (via conduction and/or convection) to the thermal storage system 708. Alternatively or additionally, an auxiliary heater 714 can provide enthalpy to the thermal storage system 708, for example, by heating the thermal storage fluid using electricity or a fossil fuel. The insolation received by the working fluid in solar thermal system 702 may be provided by re-directed sunlight from a plurality of heliostats or from any other solar reflection apparatus, such as a trough-based system, or in any other manner, according to one or more contemplated embodiments.

During a startup phase or when it is otherwise desirable to use the stored energy in the thermal storage system (for example, to take advantage of higher electricity rates), the setup of FIG. 7B for discharging the thermal storage system 708 can be used. In contrast to FIG. 7A, the direction of feedwater in FIG. 7B may be reversed such that water is input to the one or more heat exchangers 706. The direction of enthalpy flow in FIG. 7B is also reversed, such that heat is transferred (via conduction and/or convection) from the thermal storage system 708 to the heat exchanger 706 to heat the pressurized water flowing therethrough.

During the discharging phase shown in FIG. 7B, the working fluid for the solar collection system 702 is heated by enthalpy conductively and/or convectively transferred from the thermal storage system 708 (i.e., from storage liquid within the storage system) to heat the solar fluid via heat exchanger 706. The heated solar fluid can be provided to the solar collection system 702 where it is further heated by insolation to generate steam. The steam is then directed to the electricity generation system 704 to drive a turbine therein to generate electricity. The turbine may operate at a lower pressure and/or temperature during discharging phases than it did during the charging.

The systems can be controlled responsively to one or more of the disclosed conditions, or any other condition, to switch between a charging mode of the thermal storage system and the discharging modes of the thermal storage system. Such control may be performed by one or more control systems. For example, the control system may provide a charging mode during a high insolation period of the day, switch to a discharging only mode during a startup period, and/or switch back to a charging mode when excess electricity is present in the electrical grid.

The teachings disclosed herein can be useful for increasing solar energy generation efficiency during days of intermittent cloudy periods, maximizing electricity production and/or revenue generation of a solar electric facility, and/or meeting reliability requirements of an electric transmission network operator.

Various embodiments described herein relate to insolation and solar energy. However, this is just one example of a source of intermittent energy. The teachings herein can be applied to other forms of intermittent energy as well, according to one or more contemplated embodiments. Steam can be generated by other sources of energy and used to charge a thermal storage system. For example, fossil fuels, electricity heaters, nuclear energy, or any other source could be used to generate steam to charge the thermal storage system in addition to or in place of steam generated by insolation. In addition, while the auxiliary heater has been described as using electricity or fossil fuels, other energy sources are also possible, such as, but not limited to, nuclear and geothermal. Alternatively or additionally, the thermal storage fluid can be heated using dumped or unused insolation from the solar collection system. For example, the unused insolation can be reflected away from the solar receiver and onto a receptacle or conduit for the thermal storage fluid (e.g., a heat exchanger) such that the thermal storage fluid is directly heated by the insolation instead of through insolation-produced steam.

Although aspects of the present disclosure relate to the production of steam using insolation for the production of electricity, it is also contemplated that the teachings presented herein can be applied to solar thermal systems that convert insolation into any of a heated working fluid, mechanical work, and electricity. Although panel-type heliostats with a central solar tower are discussed above, the teachings of the present disclosure are not limited thereto. For example, redirection and/or concentration of insolation for heating a working fluid can be accomplished using an elongated trough reflector.

Although various embodiments of the thermal storage system are explained in terms of a specific case where the number of reservoirs is two, it is noted that fewer or greater than two reservoirs can also be used according to one or more contemplated embodiments. Moreover, some of the examples discussed herein relate to a single-phase thermal storage system for a multi-phase power generation systems. However, the teachings presented herein are not to be so limited. Rather, the teachings presented herein can be applicable to multi-phase thermal storage systems according to one or more contemplated embodiments.

Moreover, while specific examples have been discussed with respect to using water/steam as a solar fluid, it is further contemplated that other solar fluids can be used as well. For example, salt-water and/or pressurized carbon dioxide can be used as a solar fluid. Other solar fluids are also possible according to one or more contemplated embodiments. In addition, while specific examples have been discussed with respect to using molten salt and/or molten metal as the thermal storage medium, it is contemplated that other types of thermal storage media can be used as well.

It will be appreciated that the modules, processes, systems, and sections described above can be implemented in hardware, hardware programmed by software, software instruction stored on a non-transitory computer readable medium or a combination of the above. A system for controlling the thermal storage system, the solar collection system, and/or the electricity generating system can be implemented, for example, using a processor configured to execute a sequence of programmed instructions stored on a non-transitory computer readable medium. The processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the modules, processes, systems, and sections can be implemented as a single processor or as a distributed processor. Further, it should be appreciated that the steps discussed herein can be performed on a single or distributed processor (single and/or multi-core). Also, the processes, modules, and sub-modules described in the various figures of and for embodiments above can be distributed across multiple computers or systems or can be co-located in a single processor or system. Exemplary structural embodiment alternatives suitable for implementing the modules, sections, systems, means, or processes described herein are provided below, but not limited thereto. The modules, processors or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed method, system, and computer program product can be implemented in software executed on a programmed general purpose computer, a special purpose computer, a microprocessor, or the like.

Embodiments of the method and system (or their sub-components or modules), can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the method, system, or a computer program product (software program stored on a non-transitory computer readable medium).

Furthermore, embodiments of the disclosed method, system, and computer program product can be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of solar collection, thermal storage, electricity generation, and/or computer programming arts.

Features of the disclosed embodiments can be combined, rearranged, omitted, etc., within the scope of the invention to produce additional embodiments. Furthermore, certain features can sometimes be used to advantage without a corresponding use of other features.

It is thus apparent that there is provided in accordance with the present disclosure, system, methods, and devices for thermal storage. Many alternatives, modifications, and variations are enabled by the present disclosure. While specific embodiments have been shown and described in detail to illustrate the application of the principles of the present invention, it will be understood that the invention can be embodied otherwise without departing from such principles. Accordingly, Applicants intend to embrace all such alternatives, modifications, equivalents, and variations that are within the spirit and scope of the present invention.

The invention claimed is:

1. A method of producing electricity comprising:
   during a first time period:
      generating steam in a solar receiver in a solar thermal system using insolation directed onto the solar receiver;
      producing electricity by driving a steam turbine using the generated steam from the solar receiver; and
      at a same time as said generating steam and the producing electricity, storing heat energy in a thermal storage fluid, which includes a molten salt and/or a molten metal, by at least one of heating the thermal storage fluid using an electric heater and heating the thermal storage fluid by burning a fossil fuel; and
   during a second time period:
      producing electricity by transferring the heat energy stored in the thermal storage fluid to the solar thermal system;
   wherein the heat energy stored during the first time period is sufficient to generate steam for use by the steam turbine in the producing electricity during the second time period.

2. The method of claim 1, wherein said transferring the heat energy stored includes passing the thermal storage fluid through a heat exchanger to generate the steam for use by the steam turbine in producing electricity during the second time period.

3. The method of claim 1, wherein said transferring the heat energy stored increases the enthalpy of pressurized water or steam in the solar thermal system.

4. The method of claim 1, wherein the storing heat energy in the thermal storage fluid further includes separately heating the thermal storage fluid using dumped or unused insolation by the solar thermal system.

5. The method of claim 1, wherein the storing heat energy in the thermal storage fluid includes heating the thermal storage fluid using an electric heater powered by grid electricity.

6. The method of claim 1, wherein the storing heat energy includes heating a first portion of the thermal storage fluid using a portion of steam from the solar thermal system and heating a second portion of the thermal storage fluid using an electric heater or by burning a fossil fuel.

7. The method of claim 1, wherein the storing heat energy in the thermal storage fluid includes:
   at a first portion of the first time period, heating the thermal storage fluid using enthalpy from the steam generated using insolation; and
   at a second portion of the first time period, heating the thermal storage fluid using the electric heater powered by grid or main electricity.

8. The method of claim 1, wherein the first time period is in the afternoon.

9. The method of claim 1, wherein the second time period is a relatively low insolation period.

10. The method of claim 1, wherein the second time period is a startup period for the solar thermal system.

11. The method of claim 1, wherein the solar thermal system includes a solar receiver and a plurality of heliostats that concentrate and/or direct insolation onto the solar receiver to generate the steam.

12. The method of claim 5, wherein the heating using an electric heater occurs at a time when electricity rates are cheapest during a diurnal cycle.

13. The method of claim 5, wherein the heating using an electric heater occurs at a time when the electrical grid has surplus electricity for storage.

14. The method of claim 5, wherein the heating using an electric heater occurs at a time for regulation or load following.

15. The method of claim 13, wherein said heating is effective to store the surplus electricity from the electrical grid as heat in the molten salt.

16. A solar power system comprising:
   a solar receiver, in which steam is generated using insolation directed thereon;
   a plurality of heliostats that direct insolation onto the solar receiver;
   a thermal storage system having first and second reservoirs for holding a thermal storage fluid therein, the first and second reservoirs being connected together by one or more conduits such that the thermal storage fluid can flow between the first and second reservoirs;
   a heat exchanger in thermal communication with the one or more conduits and arranged such that enthalpy can be transferred to or from thermal storage fluid flowing in the one or more conduits;
   an electricity generating system that uses the generated steam to produce electricity;
   an auxiliary heater that heats the thermal storage fluid using one of electricity and a fossil fuel, the thermal storage fluid including a molten salt and/or a molten metal; and
   a controller that controls the thermal storage system, the heat exchanger, and the auxiliary heater, wherein the controller comprises electrical circuitry that is configured to:
      during a first time period, charge the thermal storage system using enthalpy transferred from steam from the solar receiver via the heat exchanger;
      during a second time period, charge the thermal storage system using heat from the auxiliary heater; and
      during a third time period, discharge the thermal storage system to generate steam from enthalpy stored in the thermal storage system to produce electricity.

* * * * *